H. KELLOGG,
Steam Plow.
No. 18,853.
Patented Dec. 15, 1857.
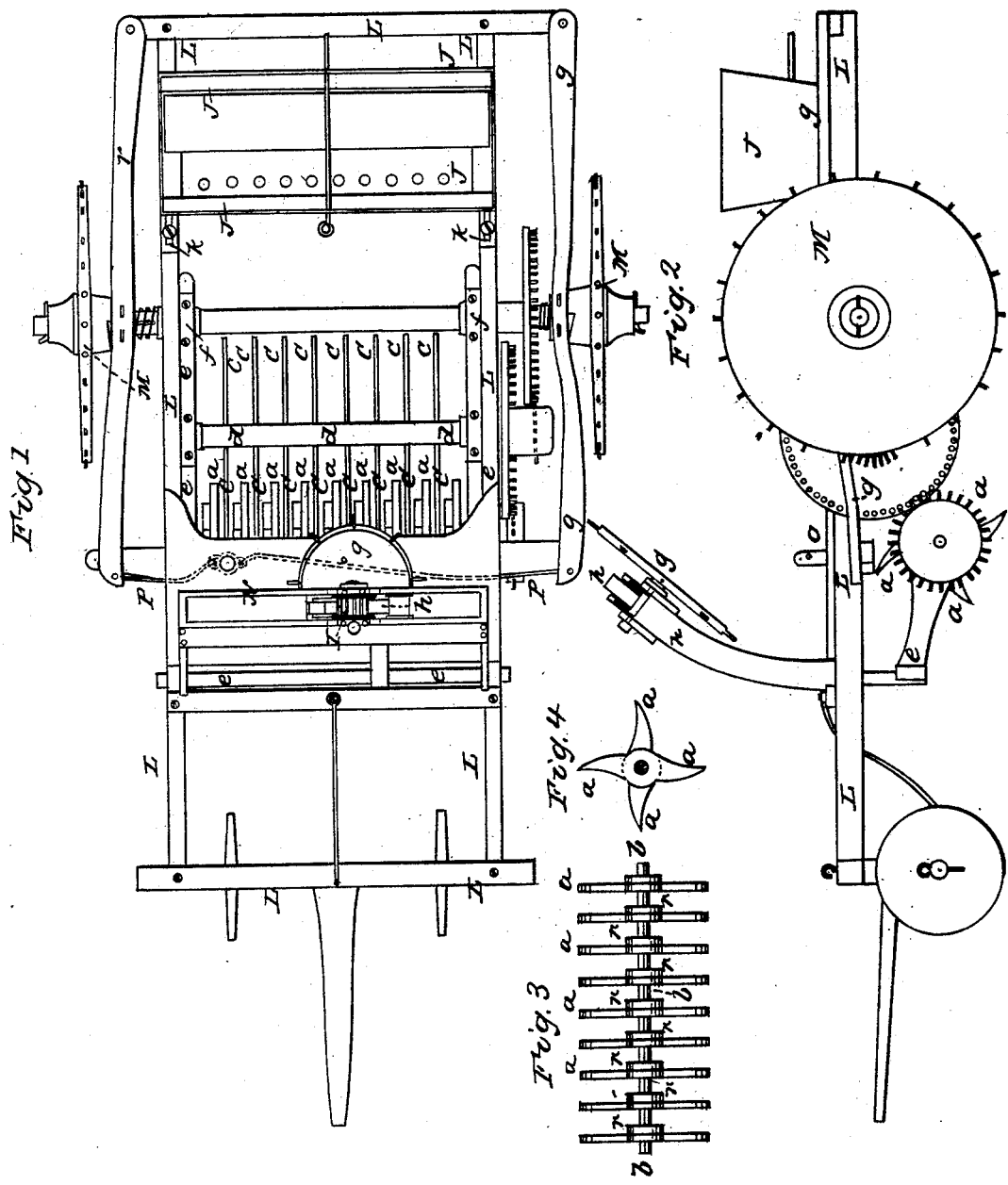

UNITED STATES PATENT OFFICE.

HIRAM KELLOGG, OF McHENRY, ILLINOIS.

IMPROVEMENT IN SEEDING-MACHINES.

Specification forming part of Letters Patent No. 18,853, dated December 15, 1857.

*To all whom it may concern:*

Be it known that I, HIRAM KELLOGG, of McHenry, in the county of McHenry and State of Illinois, have invented, made, and used certain new and useful Improvements in Machines for Plowing, Pulverizing, and Seeding Land; and I do hereby declare that the following is a full, clear, and exact description of the same, reference being had to the accompanying drawings, making a part of this specification.

Figure 1 is a top view of the machine complete. Fig. 2 is a side elevation throughout the length of the machine. Fig. 3 is a longitudinal top view of the mattock-like revolving digging-shovels attached to the shaft. Fig. 4 is an end view of the shovels.

The nature of my improvements consists in producing a unity of machine susceptible of digging or upturning the soil, pulverizing it, cleaning it of roots and fibrous substances, and of depositing and covering the grain or seed at one and the same time.

The mechanical elements embraced in the nature of my improvements consists in the construction of a series of mattock-like revolving digging-shovels of the form shown in Fig. 4, having double digging ends $a\ a\ a\ a$, each individual shovel formed with a hole in its center. These mattock-like revolving digging-shovels are arranged across each other at right angles in pairs, as in Fig. 2, and series of these shovels so arranged are adjusted and affixed at suitable intervals from each other upon a horizontal revolving axle or shaft, as shown in Figs. 1 and 3 at $a\ a\ a\ a\ a$. These pairs of mattock-like revolving digging-shovels may be attached to the shaft $b\ b\ b$, Fig. 3, in any secure manner, collars or washers of suitable size and thickness being found to answer the desired purpose, the thickness of the washers affording the required distance or space between each pair of the said mattock-like revolving digging-shovels $a\ a$, Figs. 3 and 4. The collars or washers alluded to are not represented, however, but merely the spaces for them, as at $r\ r$, Fig. 3. These mattock-like revolving digging-shovels, as shown and described, are combined in the operation with a revolving rake or scatterer device, $c\ c\ c\ c\ c\ c$, formed of the rods $c$, attached to or passing through a horizontal shaft, $d\ d$, Fig. 1. The said mattock-like revolving digging-shovels and the combined rotary rake or scatterer are arranged in an adjustable graduating framing, $e\ e\ e\ e\ e\ e$, which framing is hung to or swings on the axle-tree of the driving or transportation wheels of the machine, as at $f\ f$, Fig. 1, so that these mattock-like revolving digging-shovels and the rotary scatterer or rake devices may be elevated and depressed through the intervention of a windlass-wheel, rack, and pinion, as at $g\ h\ i$, Figs. 1 and 2.

The other feature, considered as a combination improvement, is the sliding adjustable hopper J J J J, Figs. 1 and 2, this adjustability being brought about by means of slotted sliding strips $k\ k$, Fig. 1, attached to the bottom of the hopper and resting on the main framing L L L L L L. The mattock-like revolving digging-shovels, the rake or scatterer, and the axle of the machine are provided with cog-wheels or suitable gearing working into each other, the whole being set in motion by the action of the transportation-wheels M M.

In the operation of the machine one or more horses may be attached to the front thereof to transport it, and as the machine advances forward the mattock-like revolving digging-shovels are set in motion, and in their revolution their points enter the soil, dig it, and lift it, and, throwing it backward against the revolving rake or scatterer, the soil is broken and the roots or other useless matter are caught by the prongs of the rake and loosened from the soil. While the soil is being broken the seed or grain is dropping from the perforated hopper, and in its descent therefrom the scattering soil falls over the deposited grain and is effectually covered up, as desired; and the greater or less depth of deposit is brought about by sliding the graduating or adjustable hopper back or forth, as may be desired—that is to say, if it desired the grain should be covered to a greater depth, then the hopper is slid forward toward the mattock-like revolving digging-shovels; and if the grain is to be covered lightly, then the hopper is to be slid backward toward the rear end of the machine. The centrifugal action of the mattock-like revolving digging-shovels and the movement or momentum of the machine enable effectually the covering of the falling grain or seed, mingling as it does with the broken scattering soil.

The driver or operator of the machine stands or sits on the platform at N, Fig. 1, and when desired can throw the said mattock-like revolving digging-shovels and revolving rake out of gear through means of the lever O and the rods P P, attached to the spring or flexible side strips, $q\ q\ q$, Figs. 1 and 2, and when any obstruction or clogging roots are encountered the mattock-like revolving digging-shovels and the scatterer or rake device are elevated or lifted up by means of the windlass device, rack, and pinion $g\ h\ i$. The depth of digging can also be regulated by the agency of elevating or depressing the devices described.

It must be observed that the peculiar combination of the mattock-like revolving digging-shovels with the pulverizing rods or fingers, combined in arrangement and operation with an adjustable sliding graduating-hopper, produces a unity of machine admitting of performing at one and the same time the several duties or offices of digging up, pulverizing, scattering the soil, and depositing and covering the seed or grain to any required depth, all of which, as is claimed, have never been done or accomplished by any one single or individual machine.

In prairie ground and bottom land my machine has been successfully tried, and has been found especially well adapted and of great utility, dispensing entirely with the heretofore-required several separate distinct operations of first plowing, next harrowing, seeding, and covering the grain. Hence it is contended that my improvements embrace features of utility not heretofore in use in this important particular.

Another most important feature of improvement pertaining to my machine is that in marshy or what is termed "sluiced" land, where water has been deposited and has passed off, and where cattle in grazing have made the surface of the soil rough and irregular by the imprints of their hoofs, the machine is particularly well adapted, from the fact that the irregular surfaces and the subsoil are turned up, the roots of the wild grass and other injurious growth being completely chopped up and the face of the soil made level, which enables the seed deposited and covered by the machine to take uniform root and acquire regular growth, which could not be attainable by merely employing the ordinary slicing-blades, revolving harrows, or rotary spikes, they not being susceptible of digging, lifting, and turning the soil at the same time in their action. It is therefore obvious that my machine possesses features of operation and utility that no other single machine embraces, and it is contended and established by actual test and practical operation that at least half as much again can be accomplished in half the time given than can be by any other single machine known and used.

Having fully described the nature, construction, and operation of my improved machine, and being fully aware that revolving harrows, pulverizing-cylinders, and shafts with spikes and slicing-blades have been used, I therefore do not claim such devices singly or in combination; but What I do claim, and desire to have secured by Letters Patent of the United States, is—

The construction of the double-pointed mattock-like revolving digging-shovels, arranged together in pairs at right angles to each other, as in Fig. 4, and having passing through their centers a shaft or axle, as in Fig. 3, and in arrangement and operation with a revolving scatterer, $c\ c\ c\ d\ d\ d$, attached to an adjustable graduating-framing, $e\ e\ e\ e\ f\ f$, and in combination with an adjustable sliding hopper or seed-fountain, J J, as described, and through all of which devices, forming an individual or unity of machine, the soil is dug up, pulverized, and scattered, and the seed or grain is deposited and covered up to a greater or less depth in one operation of the machine, substantially as set forth.

HIRAM KELLOGG.

Witnesses:
JOHN S. HOLLINGSHEAD,
W. A. BOSS.